US010587072B2

(12) United States Patent
Yan et al.

(10) Patent No.: US 10,587,072 B2
(45) Date of Patent: Mar. 10, 2020

(54) ISOLATED WIRE ROD WATERPROOF STRUCTURE AND ELECTRIC DEVICE PROVIDED WITH SAME

(71) Applicant: HANGZHOU HIKVISION DIGITAL TECHNOLOGY CO., LTD., Hangzhou (CN)

(72) Inventors: Caisheng Yan, Hangzhou (CN); Zhan Ye, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/473,951

(22) PCT Filed: Jan. 4, 2018

(86) PCT No.: PCT/CN2018/071334
§ 371 (c)(1),
(2) Date: Jun. 26, 2019

(87) PCT Pub. No.: WO2018/133671
PCT Pub. Date: Jul. 26, 2018

(65) Prior Publication Data
US 2019/0326705 A1    Oct. 24, 2019

(30) Foreign Application Priority Data

Jan. 20, 2017  (CN) .................... 2017 2 0075706 U
Jan. 20, 2017  (CN) .................... 2017 2 0086131 U (51) Int. Cl.
*G03B 17/08*       (2006.01)
*H01R 13/52*       (2006.01)
*H01R 12/53*       (2011.01)

(52) U.S. Cl.
CPC ......... *H01R 13/5208* (2013.01); *G03B 17/08* (2013.01); *H01R 12/53* (2013.01); *H01R 13/5213* (2013.01)

(58) Field of Classification Search
USPC ........................................... 396/25
See application file for complete search history.

(56) References Cited

U.S. PATENT DOCUMENTS 5,217,387 A * 6/1993 Hull .................. H01R 13/6392
                                                      439/367
5,796,041 A * 8/1998 Suzuki .................. H02G 15/18
                                                      174/92

(Continued)

FOREIGN PATENT DOCUMENTS

CN        203645050        6/2014
CN        103996945        8/2014

(Continued)

OTHER PUBLICATIONS

International Search Report and Written Opinion issued in Corresponding International Patent Application No. PCT/CN2018/071334, dated Mar. 30, 2018.

*Primary Examiner* — Rodney E Fuller
(74) *Attorney, Agent, or Firm* — Norton Rose Fulbright US LLP (57) ABSTRACT

An isolated waterproof cable for a wire and an electrical device provided with the same are disclosed. The isolated waterproof cable for a wire includes: a wire body (11) including at least one core wire (110), each core wire includes a conductive wire (113) and an insulating sheath (112) provided outside the conductive wire (113); a seal provided at an end of the wire body (11); and at least one connector (12) connected with the conductive wire (113), and a segment of the connector (12) or the conductive wire (113) is sealed within the seal. The isolated waterproof cable (Continued)

for a wire provided by the embodiments of the present application prevents water vapor from flowing along the conductive wire and entering the electric device by sealing a segment of the connector or the conductive wire, thereby providing good waterproof performance, for example, the camera fogging problem can be well solved.

12 Claims, 8 Drawing Sheets

(56) References Cited

U.S. PATENT DOCUMENTS

| | | | |
|---|---|---|---|
| 7,285,725 B1 * | 10/2007 | Saman | H01R 13/5221 174/84 R |
| 2008/0105563 A1 * | 5/2008 | Hiner | H02G 3/081 205/724 |

FOREIGN PATENT DOCUMENTS

| | | |
|---|---|---|
| CN | 203800287 | 8/2014 |
| CN | 205212056 | 5/2016 |
| CN | 206412541 | 8/2017 |
| CN | 206558774 | 10/2017 |
| JP | 2014-011097 | 1/2014 |

* cited by examiner

ISOLATED WIRE ROD WATERPROOF STRUCTURE AND ELECTRIC DEVICE PROVIDED WITH SAME

CROSS-REFERENCE TO RELATED APPLICATIONS

The present application is a national phase under 35 U.S.C. § 371 of International Application No. PCT/CN2018/071334, filed Jan. 4, 2018, which claims priority to Chinese patent application for utility model No. 201720086131.5, filed with the State Intellectual Property Office of the People's Republic of China on Jan. 20, 2017 and entitled "ISOLATED WIRE ROD WATERPROOF STRUCTURE AND ELECTRICAL DEVICE PROVIDED WITH SAME" and Chinese patent application for utility model No. 201720075706.3, filed with the State Intellectual Property Office of the People's Republic of China on Jan. 20, 2017 and entitled "ISOLATED WIRE ROD WATERPROOF STRUCTURE AND ELECTRIC DEVICE PROVIDED WITH SAME", each of which are incorporated herein by reference in their entireties.

TECHNICAL FIELD

The present application relates to the field of security technology, in particular to an isolated waterproof cable for a wire and an electrical device provided with the same.

BACKGROUND

Wires are commonly used electrical connection assemblies in an electrical device. Wires generally include a plurality of core wires and protective sheathes enclosing them. Each core wire typically consists of one or more conductive wires (normally copper wires or copper wire bundles) and one or more insulating sheathes enclosing them. There are gaps between the conductive wires in the core wire and between the conductive wires and insulating sheathes. These gaps make it easy for the outside water vapor to be absorbed into the electrical device due to siphon phenomenon. That is to say, when wires are connected to an electrical device, water vapor will enter the interior of the electrical device along with the wires, thus causing damage to the electrical device. For example, for a camera, once water vapor enters the interior of the camera, fogging phenomenon occurs on the glass of the camera, which will seriously affect imaging quality of the camera.

Thus, it is desirable to propose a technical solution to overcome or at least reduce at least one of the above disadvantages in the prior art.

SUMMARY

The objectives of embodiments of the present application are to provide an isolated waterproof cable for a wire capable of preventing water vapor from entering and an electrical device provided with the same.

To achieve the above objectives, an embodiment of the present application provides an isolated waterproof cable for a wire, including:

a wire body including at least one core wire, each core wire includes a conductive wire and an insulating sheath enclosing the conductive wire;

a seal provided at an end of the wire body; and at least one connector connected with the conductive wire, and a segment of the connector or the conductive wire is sealed within the seal.

Optionally, a connection part between the connector and the conductive wire is located within the seal and sealed within the seal through pouring sealant.

Optionally, an end of the conductive wire is not enclosed by the insulating sheath, and an end of the insulating sheath is sealed within a sealant part inside the seal.

Optionally, the seal is a female socket or a male socket.

Optionally, the isolated waterproof cable for a wire includes two wire bodies, one of which is connected to the female socket and the other of which is connected to the male socket corresponding to the female socket, wherein a sealant part is provided within both the female socket and/or the male socket.

Optionally, the isolated waterproof cable for a wire can further include a connector mounting base on which the connector is mounted, the connector mounting base is provided within the female socket or the male socket, and forms a potting groove together with an inner wall of the female socket or the male socket.

Optionally, the seal is a sealing shell which is formed by two cover plates in a snap-fit manner.

Optionally, the isolated waterproof cable for a wire includes two wire bodies, one of which is connected to one end of the sealing shell and the other of which is connected to the other end of the sealing shell, wherein a sealant part is provided at both ends of the sealing shell.

Optionally, the isolated waterproof cable for a wire includes two wire bodies, and the connector is a printed circuit board (PCB), one end of which is welded with a conductive wire of one wire body, and the other end of which is welded with a conductive wire of the other wire body, the connector forms a potting groove together with the inner wall of the sealing shell.

To achieve the above objectives, an embodiment of the present application provides an electrical device, including:

a wire body including at least one core wire, each core wire includes a conductive wire and an insulating sheath enclosing the conductive wire;

a seal provided at an end of the wire body, and sealingly engaged with the housing of the electrical device, the wire body is extended from the seal to the inside of the electrical device; and at least one connector connected with the conductive wire, and a segment of the connector or the conductive wire is sealed within the seal.

To achieve the above objectives, in an embodiment of the present application, the connection part between the connector and the conductive wire is located within the seal and is sealed within the seal through pouring sealant, wherein an end of the conductive wire is not enclosed by the insulating sheath, and an end of the insulating sheath is sealed within the sealant part inside the seal.

Optionally, the seal is a female socket or a male socket.

Optionally, the electrical device can further include a connector mounting base on which the connector is mounted, the connector mounting base is provided within the female socket or the male socket, and forms a potting groove together with the inner wall of the female socket or the male socket.

Optionally, the electrical device is a camera, a wire mount is provided on a housing of the camera, and the female socket or the male socket is mounted on the wire mount directly or through a waterproof cover.

Optionally, the seal is a sealing shell which is formed by two cover plates in a snap-fit manner.

Optionally, the electrical device includes two wire bodies, and the connector is a PCB, one end of which is welded with a conductive wire of one wire body and the other end of which is welded with a conductive wire of the other wire body, the connector forms a potting groove together with the inner wall of the sealing shell.

Optionally, the electrical device is a camera.

The isolated waterproof cable for a wire provided by the embodiments of the present application prevents water vapor from flowing along the conductive wire and entering the electric device by sealing a segment of the connector or the conductive wire, thereby providing good waterproof performance, for example, the camera fogging problem can be well solved.

REFERENCE SIGNS

| 1 | female wire assembly | 2 | male wire assembly |
|---|---|---|---|
| 3 | camera housing | 4 | wire mount |
| 5 | waterproof cover | 6 | first sealing ring |
| 7 | second sealing ring | 8 | third sealing ring |
| 11 | wire body | 12 | connector |

-continued

| 13 | connector mounting base | 14 | female socket |
|---|---|---|---|
| 15 | sealant part | 16 | potting groove |
| 110 | core wire | 41 | external thread |
| 111 | protective sheath | 51 | internal thread |
| 112 | insulating sheath | 113 | conductive wire |
| 17 | sealing shell | 100 | seal |

DETAILED DESCRIPTION

In the accompanying drawings, the same or similar reference signs are used to represent the same or similar elements, or elements with the same or similar functions. Embodiments of the present application will be described below in detail in conjunction with the accompanying drawings.

In the description of the present application, the azimuth or position relationship indicated by terms "center", "longitudinal" and "lateral", "front" and "back", "left" and "right", "vertical" and "horizontal", "top" and "bottom", "inside" and "outside" and the like is the azimuth or position relationship shown based on the accompanying drawings, and is only used to facilitate and simplify the description of the present application rather than to indicate or imply that the device or element referred to must have the particular azimuth or be constructed or operated in the particular azimuth, and thus shall not be constructed as a limitation to the protection range of the present application.

Figure 1:
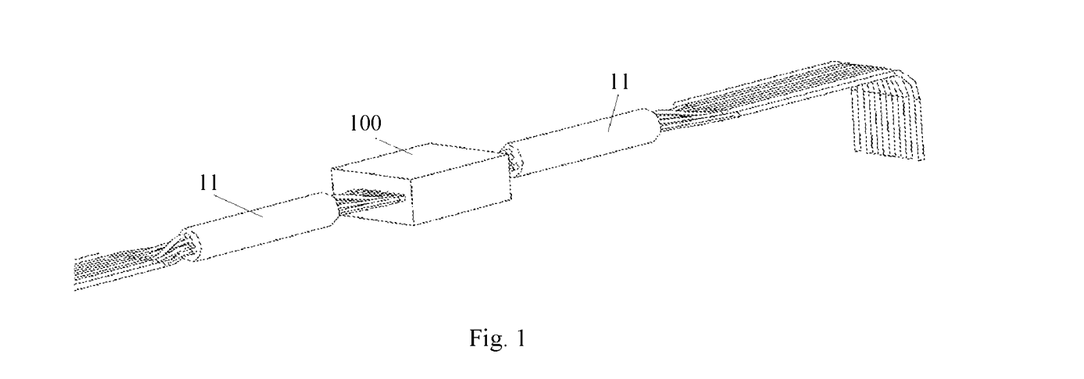
FIG. 1 is a schematic diagram of an isolated waterproof cable for a wire provided by a first embodiment of the present application.

As shown in FIG. 1, an isolated waterproof cable for a wire provided by an embodiment of the present application includes a wire body 11, a seal 100 connected to an end of the wire body 11 and at least one connector 12. The wire body 11 refers to a wire for transmitting electrical power or electrical signals. The isolated waterproof cable for a wire provided by the embodiment of the present application can include two wire bodies 11 or only one wire body 11. Each wire body 11 generally includes at least one core wire 110. Each core wire 110 includes a conductive wire 113 and an insulating sheath 112 enclosing the conductive wire 113. The seal 100 can be of any suitable structure and size. Similarly, the connector 12 can be of any suitable structure and form. Each connector 12 is connected to one conductive wire 113 within a corresponding wire body 11. A segment of the conductive wire 113 or the connector 12 is sealed within the seal 100. Thus, a flow passage of water vapor is cutoff.

In an optional embodiment, a connection part between the connector 12 and the conductive wire 113 is located within the seal 100, and is sealed within the seal 100 through pouring sealant.

In an optional embodiment, an end of the conductive wire 113 is not enclosed by an insulating sheath 112, and an end of the insulating sheath 112 is sealed within a sealant part 15 inside the seal 100.

In an optional embodiment, the seal 100 can be a female socket 14 or a male socket. Description will be made below in conjunction with FIGS. 2-6.

Figure 2:
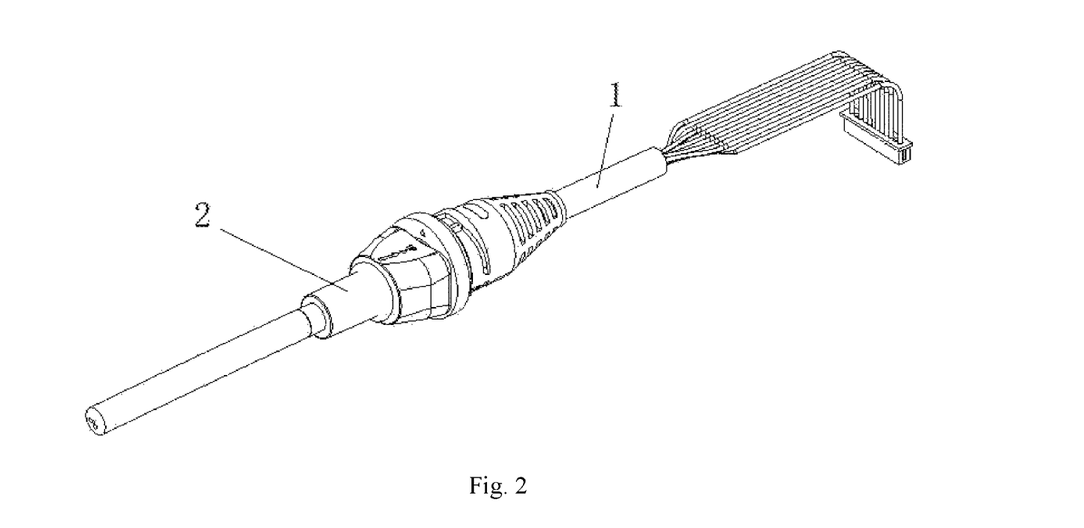
FIG. 2 is a schematic diagram of an isolated waterproof cable for a wire provided by a second embodiment of the present application.

FIG. 2 is a schematic diagram of an isolated waterproof cable for a wire provided by a second embodiment of the present application. The isolated waterproof cable for a wire illustrated includes two wire bodies 11, and a corresponding female socket 14 or male socket is provided at an end where the two wire bodies 11 are connected. The wire body connecting the female socket 14 forms a female wire assembly 1, and the wire body connecting the male socket forms a male wire assembly 2.

In the illustrated embodiment, the isolated waterproof cable for a wire includes two wire assemblies, and a sealing structure is provided for each wire assembly to seal each conductive wire in each wire assembly or each connector connected with the conductive wire. In addition, the isolated waterproof cable for a wire in an embodiment of the present application can also include only one wire assembly, which can be a female wire assembly or a male wire assembly. Moreover, the sealing structure is provided within the female socket or the male socket connected with this wire assembly to seal the connector or the conductive wire, while a corresponding male socket or female socket of a wire assembly connected therewith can be not provided with the above sealing structure.

The female wire assembly 1 will be described below as an example.

Figure 3:
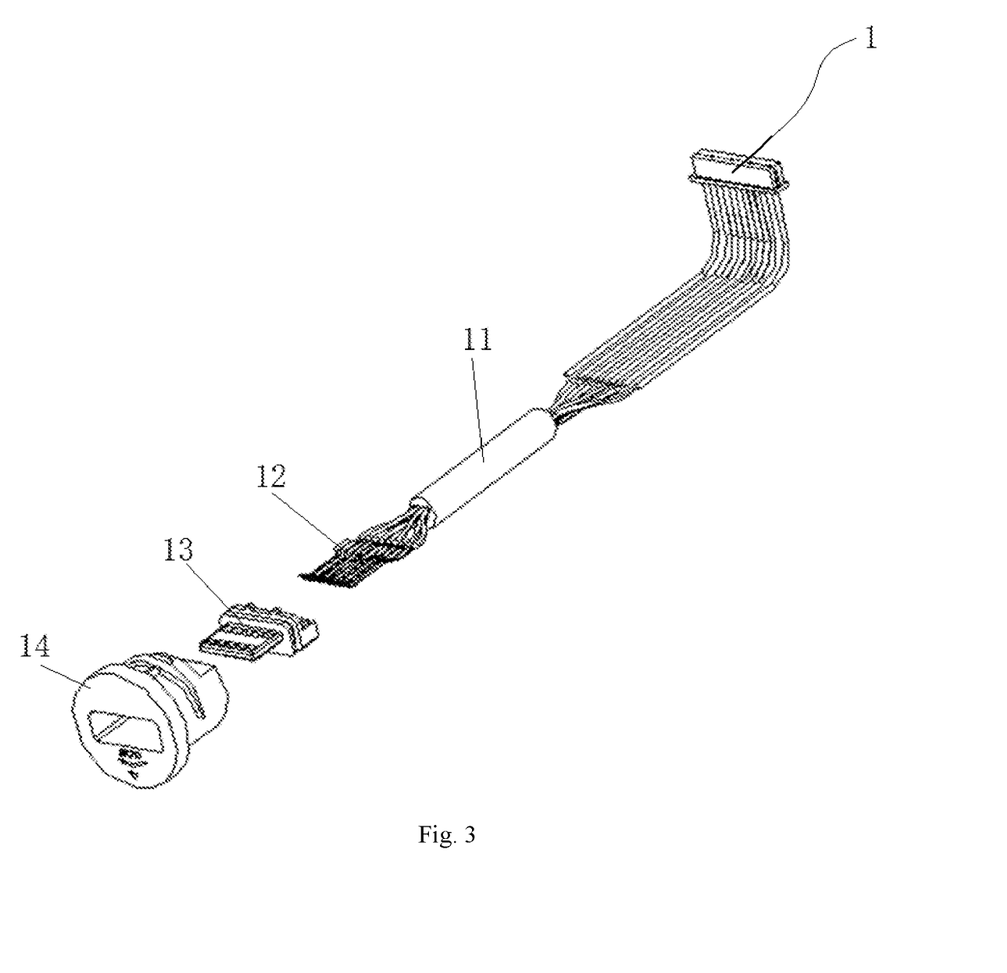
FIG. 3 is an exploded schematic diagram of the isolated waterproof cable for a wire shown in FIG. 2.
Figure 4:
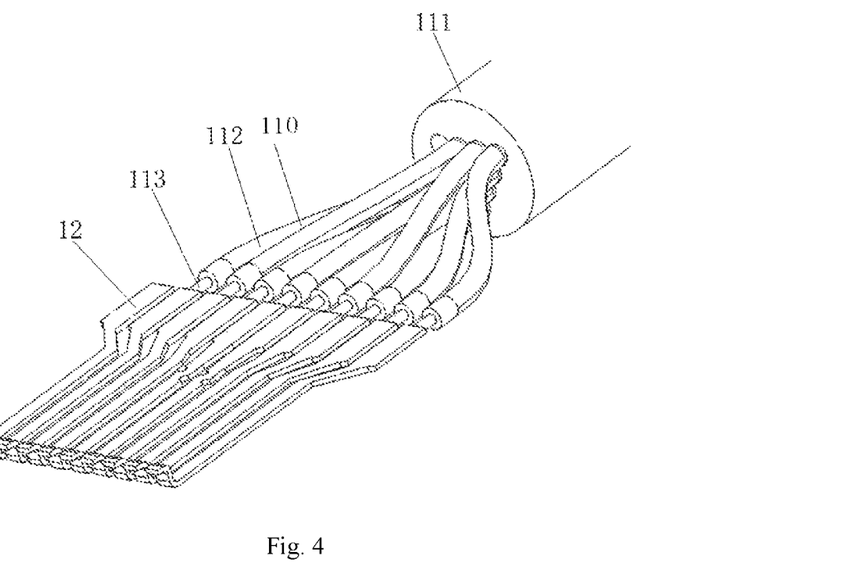
FIG. 4 is a schematic diagram of a connection structure between a wire and a connector in the isolated waterproof cable for a wire shown in FIG. 2.

FIG. 3 is an exploded schematic diagram of the isolated waterproof cable for a wire shown in FIG. 2. Specifically, FIG. 3 is an exploded schematic diagram of the female wire assembly 1. As shown, the female wire assembly 1 includes a wire body 11, a female socket 14 and a plurality of connectors 12. The wire body 11 includes at least one core wire 110, and all the core wires 110 are enclosed by a protective sheath 111. It can be understood that, the protective sheath 111 is used to protect the wire body 11 to improve the insulation performance, wear resistance and strength of the wire body 11, but it is not required always.

Each core wire 110 includes a conductive wire 113 and an insulating sheath 112 enclosing the conductive wire 113. The female socket 14 is provided at the left end of the wire body 11. The number of the connectors 12 equals to that of the conductive wires 113. It can be understood that, the number of the connectors 12 can be larger than that of the conductive wires 113, and in this case, some of the connectors 12 actually do not work.

The sealing structure is partially or entirely provided within the female socket 14, which can thereby protect the sealing structure. Here, the sealing structure can be set as needed. For example, in an optional embodiment, a sealing ring is provided for each connector 12 or conductive wire 113. In another optional embodiment, a segment of the connector 12 is provided within the connector mounting base 13 through injection molding, and the connector mounting base 13 is then sealingly connected to the female socket 14.

The injection molding here includes potting sealant. Here, potting sealant is also called pouring sealant. A groove for potting is called a potting groove 16, and a sealant part 15 is formed after potting sealants in the potting groove 16.

Figure 5:
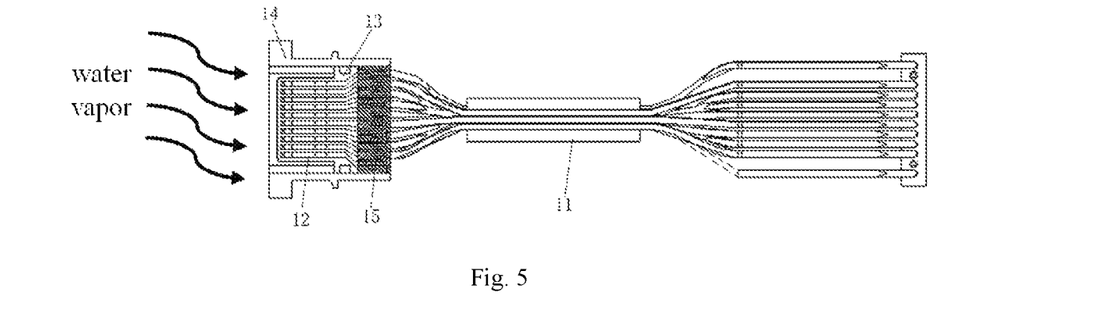
FIG. 5 is a cross-sectional diagram of the isolated waterproof cable for a wire shown in FIG. 2.
Figure 6:
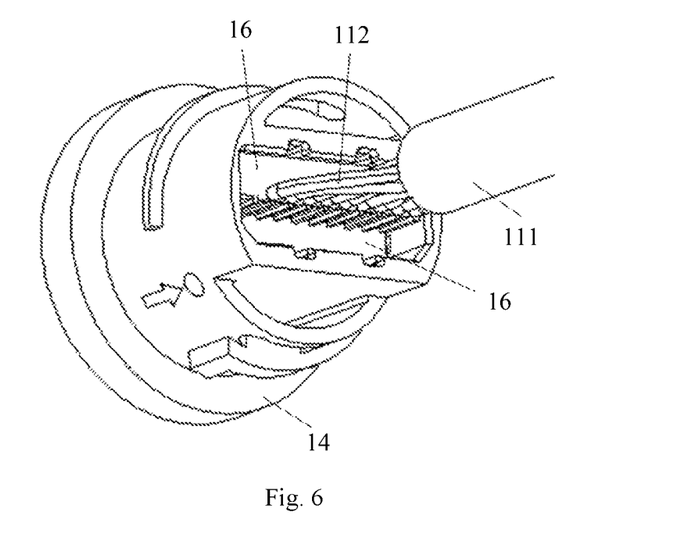
FIG. 6 is a partial schematic diagram of the isolated waterproof cable for a wire shown in FIG. 2 without pouring sealant.

As shown in FIG. 5, in an optional embodiment of the present application, the sealing structure is formed through pouring sealant to cut off the siphon passage. Specifically, the connection part between the connector 12 and the conductive wire 113 is located within the female socket 14 and sealed within the female socket 14 through pouring sealant. That is to say, the gap between adjacent connectors 12 and/or between adjacent conductive wires 113 is eliminated by forming a sealant part 15 within the female socket 14. Thus, the siphon passage is completely cut off. As shown in FIG. 5, water vapor from outside cannot pass through the sealant part 15, so that an isolated waterproof cable for a wire is realized.

Advantageously, an end of the conductive wire 113 is not enclosed by the insulating sheath 112, and an end of the insulating sheath 112 is sealed within the sealant part 15 inside the female socket 14. In this way, the sealant part 15 seals the end of the insulating sheath 112 at the same time and prevents water vapor from entering between the insulating sheath 112 and the conductive wire 113. Thus, even if there is a gap between the sealant part 15 and the inner wall of the female socket 14, water vapor cannot enter between the insulating sheath 112 and the conductive wire 113.

As previously mentioned, in an optional embodiment, there are two wire bodies 11, one of which is connected to the female socket 14 and the other of which is connected to the corresponding male socket, wherein the sealant part 15 is provided within only one of the female socket 14 and the male socket. This helps to reduce the number of sealant parts and thereby reduce manufacturing costs.

In another optional embodiment, there are two wire bodies 11, one of which is connected to the female socket 14 and the other of which is connected to the corresponding male socket, wherein the sealant part 15 is provided within both the female socket and the male socket. This helps to improve sealing reliability.

As shown in FIG. 3, the isolated waterproof cable for a wire can further include a connector mounting base 13.

The connector mounting base 13 is used to mount the connector 12, so that each connector 12 is in a setting position and adjacent connectors 12 are prevented from contacting with each other. The connector mounting base 13 is made of insulating material. The connector mounting base 13 is provided within the female socket 14 or male socket, and the connector mounting base 13 and the inner wall of the female socket 14 or the male socket forms a potting groove 16. It can be understood that the gap between the radial periphery of the connector mounting base 13 and the inner wall of the female socket 14 or male socket is small, to avoid the sealant from flowing through the gap into the female socket 14 or the male socket during potting. In an optional embodiment, the size of the cross section of the potting groove 16 is larger than that of the radial periphery of the connector mounting base 13, so that the connector mounting base 13 or the radical protrusion thereof blocks one end of the potting groove 16.

In another optional embodiment, the seal 100 is a sealing shell 17 formed by two cover plates in a snap-fit manner, which is convenient for disassembly and assembly and maintenance at a later stage. Description will be made below in conjunction with FIGS. 7-9.

Figure 7:
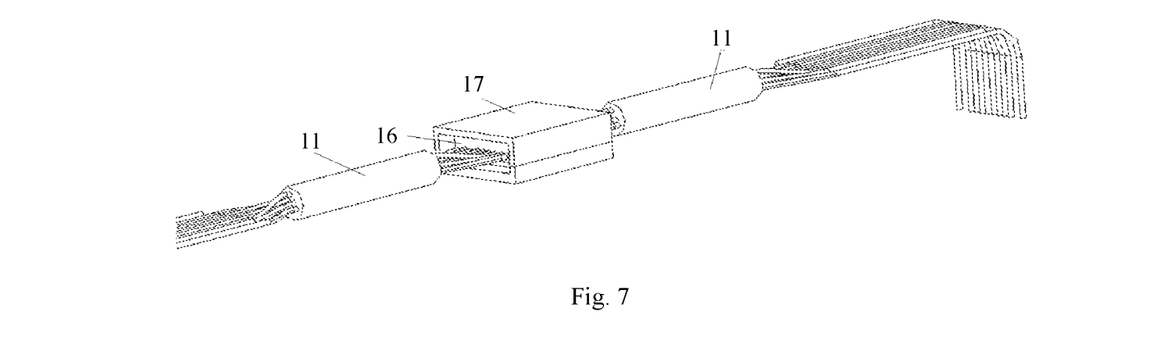
FIG. 7 is a schematic diagram of an isolated waterproof cable for a wire provided by a third embodiment of the present application.

FIG. 7 is a schematic diagram of an isolated waterproof cable for a wire provided by a third embodiment of the present application. The illustrated isolated waterproof cable for a wire includes two wire bodies 11, the conductive wires 113 of the two wire bodies 11 are integrally connected through the connectors 13, and a sealing shell 17 is provided on an end where the two wire bodies 11 are connected to each other. A sealing structure is provided between each wire body 11 and the sealing shell 17 to seal each conductive wire 113 in each wire body 11 or each connector 12 connected to the conductive wire 113.

Figure 8:
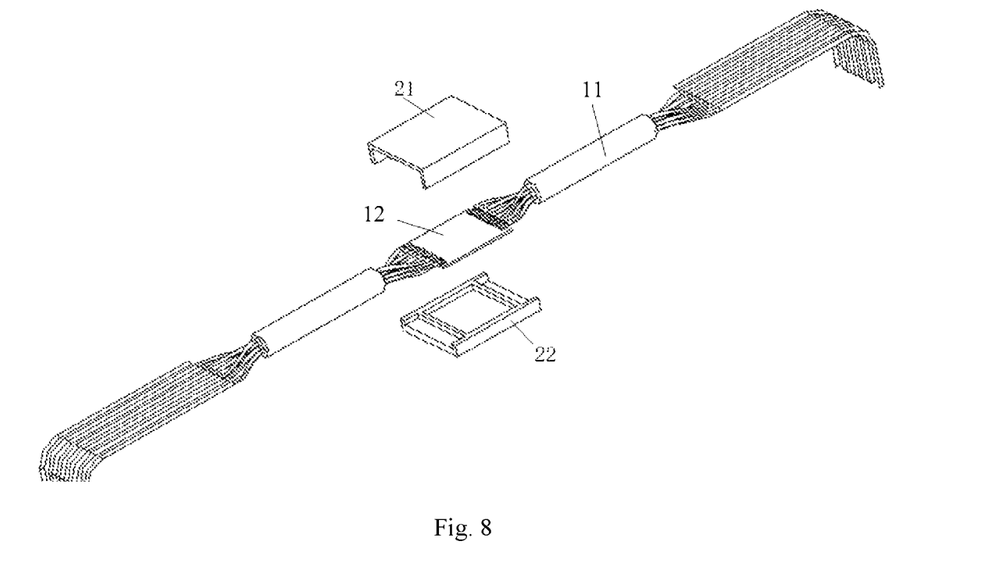
FIG. 8 is an exploded schematic diagram of the isolated waterproof cable for a wire shown in FIG. 7.
Figure 9:
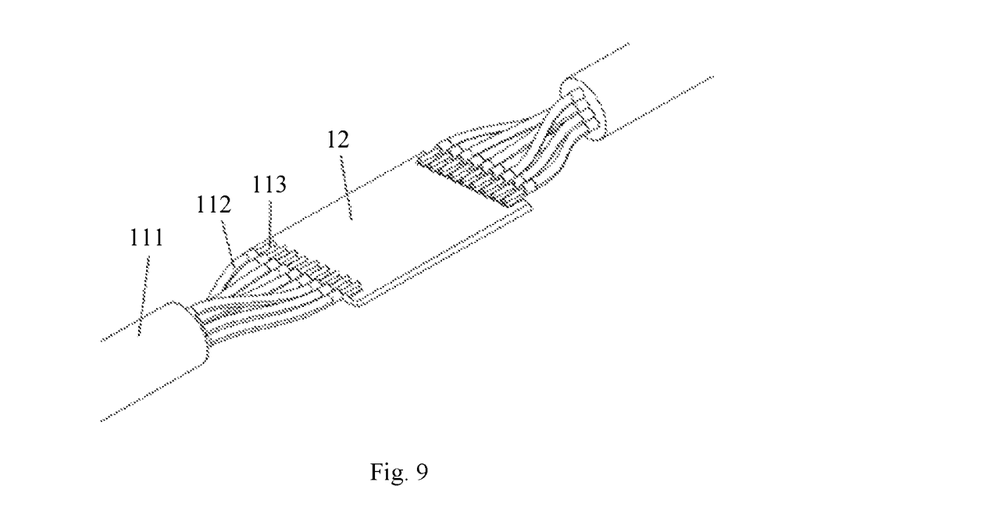
FIG. 9 is a schematic diagram of a connection structure between a wire and a connector in the isolated waterproof cable for a wire shown in FIG. 7.
Figure 10:
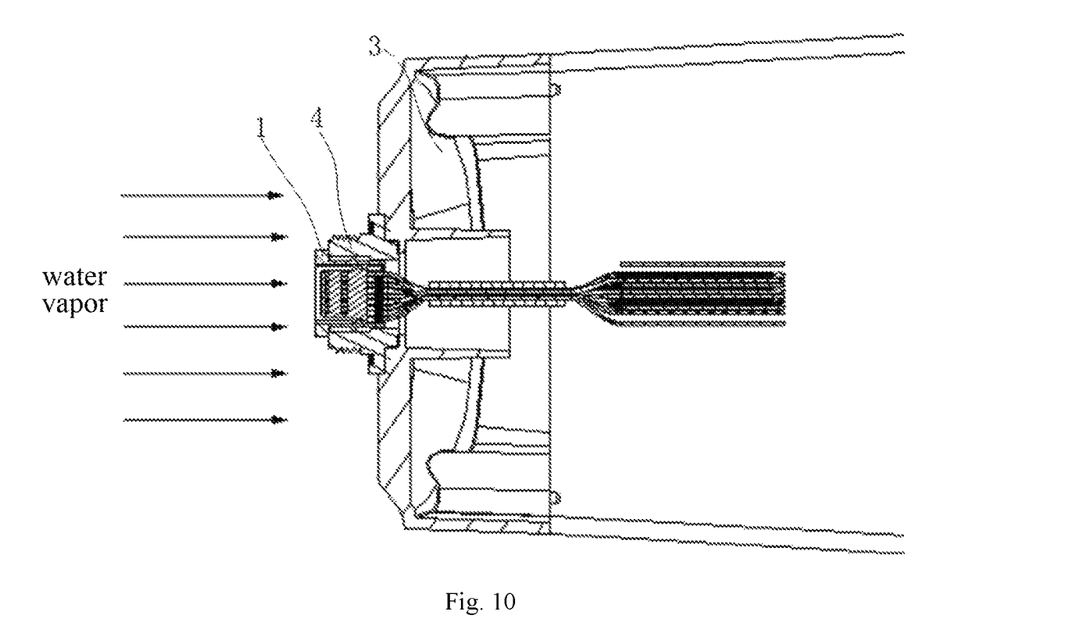
FIG. 10 is a partial schematic diagram of a camera provided with the isolated waterproof cable for a wire shown in FIG. 2.

FIG. 8 is an exploded schematic diagram of the isolated waterproof cable for a wire shown in FIG. 7. As shown, the isolated waterproof cable for a wire includes a wire body 11, a sealing shell 17 and connectors 12. The wire body 11 includes at least one core wire 110, and all the core wires 110 are enclosed by a protective sheath 111. It can be understood that, the protective sheath 111 is used to protect the wire body 11 to improve the insulation performance, wear resistance and strength of the wire body 11, but it is not required always. Each core wire 110 includes a conductive wire 113 and an insulating sheath 112 enclosing the conductive wire 113.

The sealing structure is partially or entirely provided within the sealing shell 17, which can thereby protect the sealing structure. Here, the sealing structure can be set as needed. For example, in an optional embodiment, a sealing ring can be provided for each connector 12 or conductive wire 113. A segment of the connector 12 can be directly sealed and connected within the sealing shell 17 by other means. Embodiments of the present application are not limited thereto.

As shown in FIG. 7, in an optional embodiment of the present application, the sealing structure is formed through pouring sealant to cut off the siphon passage. Specifically, the connection part between the connector 12 and the conductive wire 113 is located within the sealing shell 17 and sealed within the sealing shell 17 through pouring sealant. That is to say, the gap between adjacent connectors 12 and/or between adjacent conductive wires 113 is eliminated by forming a sealant part 15 within the sealing shell 17. Thus, the siphon passage is completely cut off. Water vapor from outside cannot pass through the sealant part 15, so that an isolated waterproof cable for a wire is realized.

Advantageously, an end of the conductive wire 113 is not enclosed by the insulating sheath 112, and an end of the insulating sheath 112 is sealed within the sealant part 15 inside the sealing shell 17. In this way, the sealant part 15 seals the end of the insulating sheath 112 at the same time and prevents water vapor from entering between the insulating sheath 112 and the conductive wire 113. Thus, even if there is a gap between the sealant part 15 and the inner wall of the sealing shell 17, water vapor cannot enter between the insulating sheath 112 and the conductive wire 113.

As previously mentioned, in an optional embodiment, there are two wire bodies 11, one of which is connected to one end of the sealing shell 17 and the other of which is connected to the other end of the sealing shell 17, wherein sealant parts 15 are provided at both ends of the sealing shell 17 to ensure the sealing reliability.

The connector 12 is a PCB, one end of which is welded with a conductive wire 113 of one wire body 11, and the other end of which is welded with a conductive wire 113 of another wire body 11. The connector 12 forms, with the inner wall of the sealing shell 17, a potting groove 16 for potting sealant.

An embodiment of the present application further provides an electrical device, which includes the isolated waterproof cable for a wire described above.

The electrical device includes a wire body 11, a seal 110, at least one connector 12 and a housing 3. The wire body 11 includes at least one core wire 110, each core wire 110 includes a conductive wire 113 and an insulating sheath 112 provided outside the conductive wire 113. The seal 100 is provided at an end of the wire body 11, and is sealingly engaged with the housing 3 of the electrical device, the wire body 11 is extended from the seal 100 to the inside of the electrical device. At least one connector 12 is connected with the conductive wire 113, and a segment of the connector 12 or the conductive wire 113 is sealed within the seal 100. Advantageously, the seal 100 is engaged with the housing 3 of the electrical device.

As previously stated, any suitable structure can be used to seal the connector 12 or conductive wire 113.

In an optional embodiment, the connection part between the connector 12 and the conductive wire 113 is located within the seal 100 and is sealed within the seal 100 through pouring sealant, wherein an end of the conductive wire 113 is not enclosed by the insulating sheath 112, and an end of the insulating sheath 112 is sealed within a sealant part 15 inside the seal 100.

In an optional embodiment, the seal 100 can be a female socket 14 or a male socket. Description will be made below in conjunction with FIGS. 2-6, 10-16.

The connection part between the connector 12 and the conductive wire 113 is located within the female socket 14 or the male socket and is sealed within the female socket 14 or the male socket through pouring sealant, wherein an end of the conductive wire 113 is not enclosed by the insulating sheath 112, and an end of the insulating sheath 112 is sealed within the sealant part 15 within the female socket 14 or the male socket.

Optionally, the electrical device can further include a connector mounting base 13 on which the connector 12 is mounted. The connector mounting base 13 is provided within the female socket 14 or the male socket, and forms the potting groove 16 together with the inner wall of the female socket 14 or the male socket.

Figure 11:
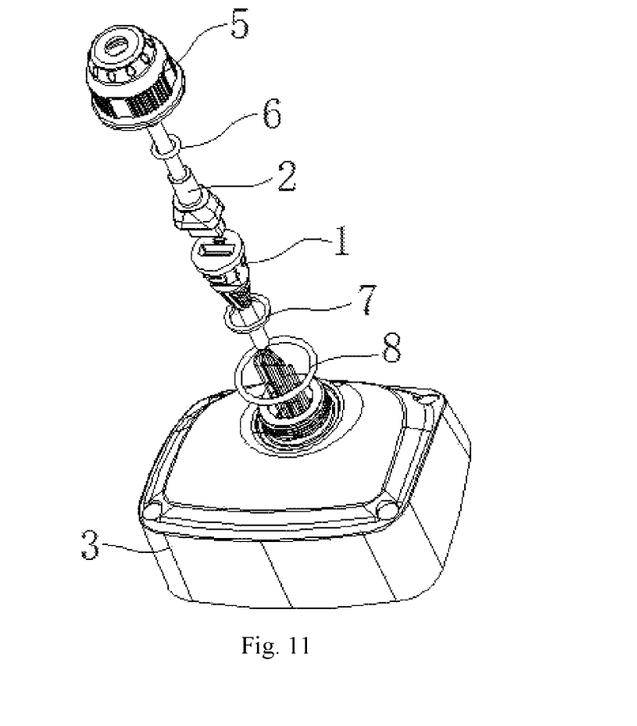
FIG. 11 is another partial schematic diagram of the camera provided with the isolated waterproof cable for a wire shown in FIG. 2.

In an optional embodiment, the electrical device is a camera. With reference to FIGS. 10-13, a wire mount 4 is provided on a camera housing 3, and the female socket 14 or the male socket is mounted on the wire mount 4 directly or through a waterproof cover 5. The waterproof cover 5 can be screwed to the wire mount 4 by thread engagement. As shown in FIG. 11, the waterproof cover 5 is sealingly engaged with the male wire assembly 2 or throwing lines outside the male wire assembly 2 through a first sealing ring 6. The waterproof cover 5 is sealingly engaged with the camera housing 3 through a third sealing ring 8. Within the waterproof cover 5, the camera housing 3 is sealingly engaged with the male socket 14 through a second sealing ring 7. The conductive wire 113 is conducted through mutual contact between corresponding connectors within the female socket 14 and the male socket.

Figure 13:
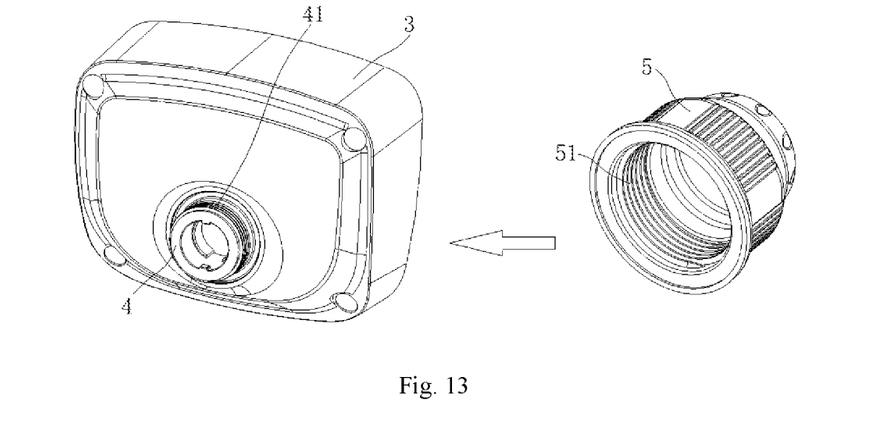
FIG. 13 is a schematic diagram of a connection structure between a waterproof cover and a camera housing.

The waterproof cover 5 can be screwed to the wire mount 4 by thread engagement. As shown in FIG. 13, the waterproof cover 5 is screwed to the wire mount 4 by the engagement of an internal thread 51 on the waterproof cover 5 with an external thread 41 on the wire mount 4.

Figure 12:
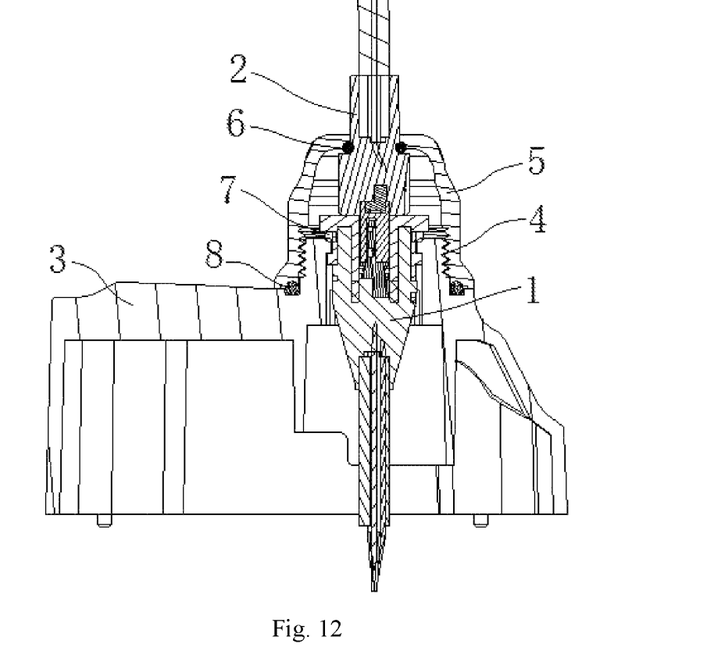
FIG. 12 is yet another partial schematic diagram of the camera provided with the isolated waterproof cable for a wire shown in FIG. 2.

Within the waterproof cover 5, the camera housing 3 is sealingly engaged with the female socket 14 though the second sealing ring 7. As shown in FIG. 12, it can be understood that the camera housing 3 is sealingly engaged with the female wire assembly 1 though the second sealing ring 7.

The isolated waterproof cable for a wire in the present application prevents water vapor from flowing along the conductive wire by sealing a segment of the connector or the conductive wire, thereby providing good waterproof performance, for example, the camera fogging problem can be well solved.

Figure 14:
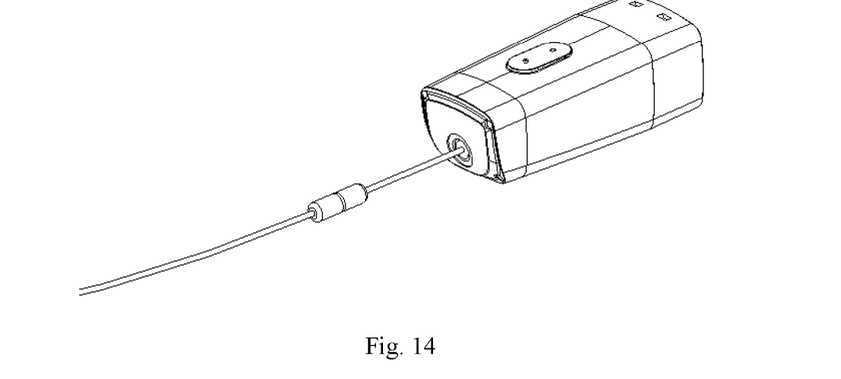
FIGS. 14 to 16 are schematic diagrams illustrating three connection relationships between the isolated waterproof cable for a wire shown in FIG. 2 and the camera housing.
Figure 15:
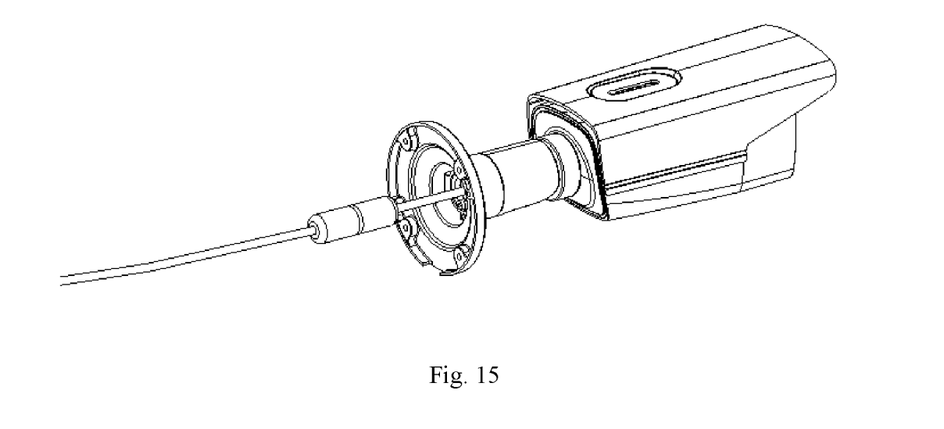
Figure 16:
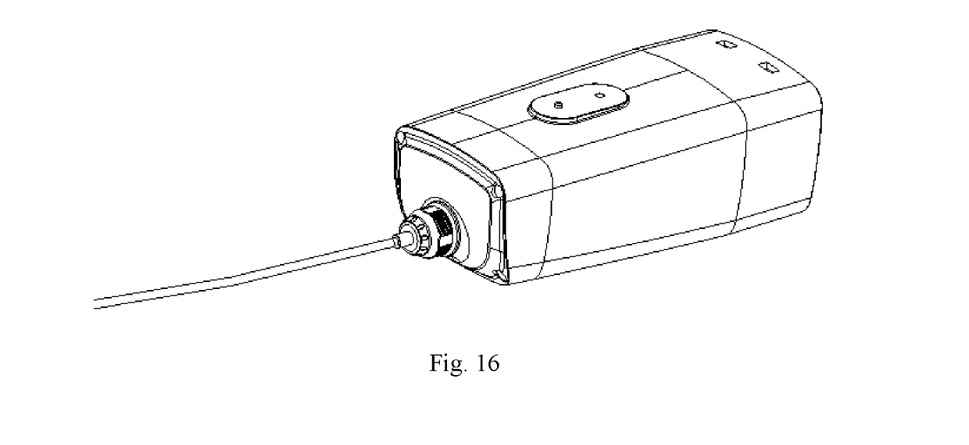

The isolated waterproof cable for a wire in the present application is applicable to various cameras, for example, a camera with a bracket, a hemispherical camera and the like. As shown in FIGS. 13 and 16, the female socket and the male socket can be fixed onto the camera housing 3 directly or through the waterproof cover 5. As shown in FIGS. 14 and 15, the female socket 14 and the male socket can be located outside the camera housing or the camera or at a distance away from the camera housing.

In another optional embodiment, the seal 100 can be a sealing shell 17 formed by two cover plates in a snap-fit manner. Description will be made below in conjunction with FIGS. 7-9.

In an optional embodiment, the connection part between the connector 12 and the conductive wire 113 is located within the sealing shell 17 and is sealed within the sealing shelling 17 through pouring sealant, wherein an end of the conductive wire 113 is not enclosed by the insulating sheath 112, and an end of the insulating sheath 112 is sealed within the sealant part 15 within the sealing shell 17.

Optionally, the connector 12 is a PCB, one end of which is welded with a conductive wire 113 of one wire body 11, and the other end of which is welded with a conductive wire 113 of another wire body 11 and forms, with the inner wall of the sealing shell 17, a potting groove 16 for potting sealant.

In an optional embodiment, the electrical device is a camera.

The isolated waterproof cable for a wire in the present application prevents water vapor from flowing along the conductive wire by sealing a segment of the connector 12 or the conductive wire 13, thereby providing good waterproof performance, for example, the camera fogging problem can be well solved.

The isolated waterproof cable for a wire in the present application is applicable to various cameras, for example, a camera with a bracket, a hemispherical camera and the like. The sealing shell 17 can be fixed to the camera housing 3 directly or through the waterproof cover 5. The sealing shell 17 can be located outside the camera housing 3 or the camera or at a distance away from the camera.

For embodiments of the electrical device, reference can be made to the embodiments of the isolated waterproof cable for a wire for the relevant part since they are basically similar to the embodiments of the isolated waterproof cable for a wire.

Finally, it should be noted that the above embodiments are only used for illustrating the technical solutions of the present application without any limitation. It should be understood by a person skilled in the art that technical solutions recited by various embodiments described above can be amended or equivalent replacements can be made for a part of the technical features therein, these amendments or replacements would not render the essence of corresponding technical solutions out of the spirit and range of the technical solutions of various embodiments of the present application.

The invention claimed is:

1. An isolated waterproof cable for a wire, comprising:
 a wire body (11) comprising at least one core wire (110), each core wire (110) comprises a conductive wire (113) and an insulating sheath (112) enclosing the conductive wire (113);
 a seal (100) provided at an end of the wire body (11); and
 at least one connector (12) connected with the conductive wire (113), and a segment of the connector (12) or the conductive wire (113) is sealed within the seal (100);
 wherein the seal (100) is a sealing shell (17) which is formed by two cover plates in a snap-fit manner;
 wherein the isolated waterproof cable for a wire comprises two wire bodies (11), one of which is connected to one end of the sealing shell (17) and the other of which is connected to the other end of the sealing shell (17), wherein a sealant part (15) is provided at both ends of the sealing shell (17), and
 wherein the seal (100) is a female socket (14) or a male socket.

2. The isolated waterproof cable for a wire of claim 1, wherein a connection part between the connector (12) and the conductive wire (113) is located within the seal (100) and sealed within the seal (100) through pouring sealant.

3. The isolated waterproof cable for a wire of claim 1, wherein an end of the conductive wire (113) is not enclosed by the insulating sheath (112), and an end of the insulating sheath (112) is sealed within a sealant part (15) inside the seal (100).

4. The isolated waterproof cable for a wire of claim 1, comprising two wire bodies (11), one of which is connected to the female socket (14) and the other of which is connected to the male socket corresponding to the female socket (14), wherein a sealant part (15) is provided within the female socket (14) and/or the male socket.

5. The isolated waterproof cable for a wire of claim 1, further comprising a connector mounting base (13) on which the connector (12) is mounted, the connector mounting base (13) is provided within the female socket (14) or the male socket, and forms a potting groove (16) together with an inner wall of the female socket (14) or the male socket.

6. The isolated waterproof cable for a wire of claim 1, comprising two wire bodies (11), and the connector (12) is a printed circuit board (PCB), one end of which is welded with a conductive wire (113) of one wire body (11), and the other end of which is welded with a conductive wire (113) of the other wire body (11), the connector (12) forms a potting groove (16) together with an inner wall of the sealing shell (17).

7. An electrical device, comprising:
 a wire body (11) comprising at least one core wire (110), each core wire (110) comprises a conductive wire (113) and an insulating sheath (112) enclosing the conductive wire (113);
 a seal (100) provided at an end of the wire body (11) and sealingly engaged with a housing (3) of the electrical device, the wire body (11) is extended from the seal (100) to the inside of the electrical device; and
 at least one connector (12) connected with the conductive wire (113), and a segment of the connector (12) or the conductive wire (113) is sealed within the seal (100);
 wherein the seal (100) is a sealing shell (17) which is formed by two cover plates in a snap-fit manner;
 wherein the electrical device comprises two wire bodies (11), and the connector (12) is a printed circuit board (PCB), one end of which is welded with a conductive wire (113) of one wire body (11) and the other end of which is welded with a conductive wire (113) of the other wire body (11), the connector (12) forms a potting groove (16) together with an inner wall of the sealing shell (17).

8. The electrical device of claim 7, wherein a connection part between the connector (12) and the conductive wire (113) is located within the seal (100) and is sealed within the seal (100) through pouring sealant, wherein an end of the conductive wire (113) is not enclosed by the insulating sheath (112), and an end of the insulating sheath (112) is sealed within a sealant part (15) inside the seal (100).

9. The electrical device of claim 7, wherein the seal (100) is a female socket (14) or a male socket.

10. The electrical device of claim 9, further comprising a connector mounting base (13) on which the connector (12) is mounted, the connector mounting base (13) is provided within the female socket (14) or the male socket, and forms a potting groove (16) together with an inner wall of the female socket (14) or the male socket.

11. The electrical device of claim 9, wherein the electrical device is a camera, a wire mount (4) is provided on a housing (3) of the camera, and the female socket (14) or the male socket is mounted on the wire mount (4) directly or through a waterproof cover (5).

12. The electrical device of claim 7, wherein the electrical device is a camera.

\* \* \* \* \*